Nov. 19, 1940.  E. E. ROBERTS  2,222,338
NAIL OR SPIKE
Filed Sept. 20, 1938
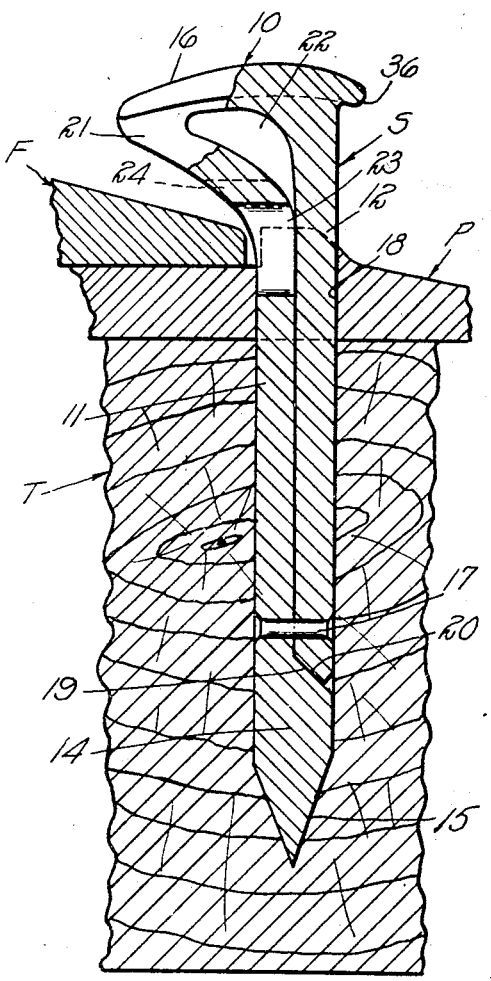
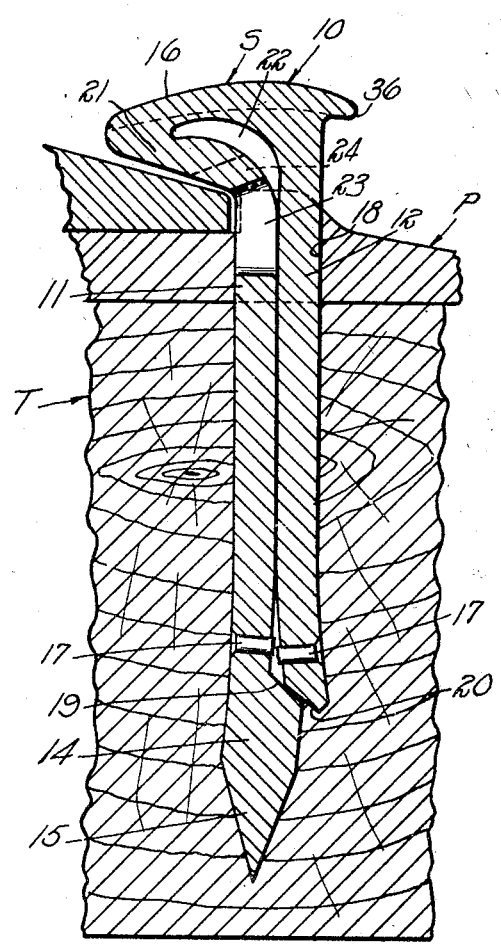
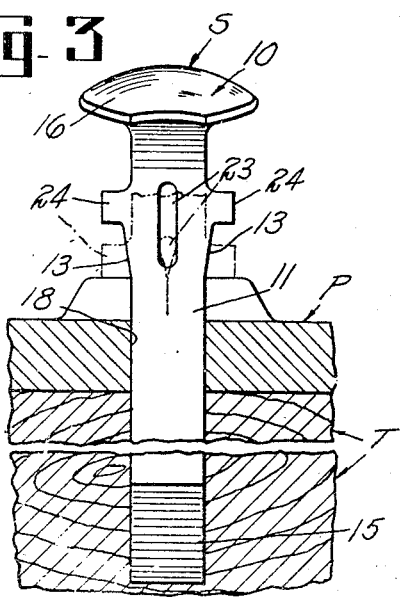
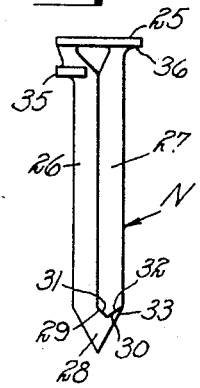
Inventor
ERVIN E. ROBERTS
By *W. Cley Lindsey*
Attorney Patented Nov. 19, 1940

2,222,338

UNITED STATES PATENT OFFICE 2,222,338

NAIL OR SPIKE

Ervin E. Roberts, East Hartford, Conn.

Application September 20, 1938, Serial No. 230,829

5 Claims. (Cl. 85—23)

The present invention relates to nails and spikes or the like, and more particularly to nails or spikes adapted to lock after being driven home.

The present invention aims to provide a nail or spike which is readily driven home and locked to prevent accidental removal thereof.

An object of the invention is to provide an improved nail or spike of the above type which is simple and inexpensive and can be readily manufactured in large quantities.

Another object of the invention is to provide a nail or spike having shank portions normally adjacent each other and adapted to be spread apart when the spike is driven home.

Another object of the invention is to provide a nail or spike having rupturable means for normally holding the shank portions together.

Another object of the invention is to provide a nail or spike having cam portions for urging the shank portions apart after being driven home.

Another object of the invention is to provide a nail or spike with outwardly projecting stop portions adjacent its head adapted to facilitate breaking the rupturable means and urging the shank portions apart.

Other objects will be in part obvious and in part pointed out more in detail hereinafter.

The invention accordingly consists in the features of construction, combination of elements and arrangements of parts which will be exemplified in the construction hereafter set forth and the scope of the application of which will be indicated in the appended claims.

In the accompanying drawing;

Fig. 1 is a sectional view of a nail or spike partly driven home, illustrating a preferred embodiment of the invention;

Fig. 2 is a sectional view of the nail or spike shown in Fig. 1 after being driven home and locked;

Fig. 3 is a fragmentary elevational view of the nail or spike shown in Figs. 1 and 2; and Fig. 4 is an elevational view, illustrating another embodiment of the invention.

Referring to the drawing and more particularly to Figs. 1 and 2, there is shown a wooden railroad tie T, a tie plate P for supporting a rail, and a spike S for holding the flange F of the rail downwardly.

The spike comprises a head 10 which may be circular or oval and a bifurcated shank having shank portions 11 and 12 integral with and depending from the head. The shank portion 11 preferably is longer than the shank portion 12 and has an enlarged portion or abutment 14 at its free end which may terminate in a tapered or pointed portion 15 adapted to facilitate driving the spike home. The shorter shank portion 12 preferably lies adjacent the shank portion 11 throughout a major portion of its length and may be held against the shank 11 by a shear pin 17 or the like formed of material adapted to break upon relative movement of the shank portions. If desired the shank portions may be so constructed that they have a tendency to spread apart but can be readily held together by riveting or otherwise securing the pin thereto. The exterior surface of the spike preferably is substantially smooth so that it will not impede the progress of a spike when driven home.

In order to facilitate spreading the shank portions, they may be provided with suitable cooperating cam means. For example, such cam means may comprise an upwardly and inwardly tapered cam portion 19 on the enlarged part 14 of the shank portion 11 and an upwardly and inwardly tapered cam portion 20 at the free end of the shank portion 12 adapted to abut the cam portion 19. When the shank portions are moved relatively with respect to each other in a longitudinal direction, the cam portions 19 and 20 are effective to spread the shank portions 11 and 12 outwardly with respect to each other. The cam portions also are effective to facilitate breaking the pin 17 or other means utilized for holding the shank portions together.

Relative movement of the shank portions may be facilitated by offsetting the shank portions 11 and 12 with respect to the head. For example, the shorter shank portion 12 may extend downwardly from the head at one side thereof while the other shank portion 11 may be connected to the other side of the head by an offset portion 21 adapted for engaging the flange F of the rail. The offset portion 21 is spaced from the underside of the head and the upper end of the shank portion 12 to provide a recess or aperture 22 which extends towards one side of the head and enables the head to move slightly downwardly to permit relative movement of the shank portions.

To drive the spike home, the side of the head above the offset portion 21 is struck to direct the major force of the blows upon the longer shank portion 11 and force the pointed end 15 thereof into the tie. To facilitate guiding the workman in striking the spike at its proper side, the upper surface 16 of the head may be tapered slightly downwardly towards the offset portion 21. In this manner, the force of the blows is exerted upon the offset portion 21 which in turn directs it to the shank portion 11.

Preferably, the spike is driven into the tie so that the underside of the offset head portion 21 is spaced slightly out of contact with the flange F (Fig. 2) to allow for expansion or contraction of the rail and tie plate due to temperature changes. To accurately and uniformly space the head from the flange, an outward projection or stop 24 (Fig. 3) is provided at each side adjacent the lower part of the offset portion 21. These stops are adapted to engage the upper surface of tie plate (Fig. 2) to stop downward movement of the spike into the tie and properly space the head portion 21 from the flange of the rail.

The stop portions 24 also serve to facilitate anchoring the shank portions of the spike. For example, when the spike has been driven into the tie, as shown in Fig. 2 the stops 24 prevent downward movement of the shank portion 11 whereby further blows on the head are effective to force the shorter shank portion relatively downwardly. A sharp blow struck on the side of the head above the shank 12 will cause the cams 19 and 20 to spread the shank portions apart and fracture the pin 17.

Another feature of the invention is to rigidly hold the tie plate against the tie. This may be accomplished by providing the sides of the spike, adjacent and below the stops 24, with upwardly diverging tapered portions 13 adapted to be wedged into the spike receiving aperture 18 of the tie plate. To facilitate forcing the spike into the tie plate without breakage of the spike or plate, the upper portion of the shank portion 11 may be provided with a slot or aperture 23 adapted to permit the tapered spike portions 13 to yield inwardly. The wedging action of the upper portion of the spike just prior to be driven home also serves to slow up the downward movement of the spike into the tie which warns the workman that the stops 24 are about to engage the tie plate. The workman then will not strike the head with a force capable of breaking the stops contacting the tie plate.

Another embodiment of the invention is illustrated in Fig. 4 wherein a nail N or the like is shown having a head 25 and a pair of bifurcated shank portions 26 and 27. The shank portion 26 is longer than the shank portion 27 and has a barb or hook shaped portion 28 adapted to engage the free end of the shank portion 27. Preferably the hook shaped portion 28 has an inwardly and upwardly inclined cam face 29 and an upwardly and outwardly inclined cam face 30 for receiving correspondingly shaped cam faces 31 and 32, respectively, on the lower end of the shank portion 27. By constructing the nail in this manner the cam faces 29 and 31 serve to spread the shank portions and shear the barb like end 33 of the hook shaped portion to facilitate further spreading of the shank portions. Normally, the faces 30 and 32 serve to hold the shank portions together.

The upper end of the shank portion 26 may be provided with an outwardly projecting portion 35 adjacent and underneath the head adapted to check movement of the nail when almost driven home. The side of the head adjacent and above the shank portion 27 may then be struck sharply to cause the cooperating faces to shear or break the end 33 of the hook shaped portion. The projecting portion 35 in this manner serves to hold the head out of the material into which it is driven to permit a sharp blow to cause the barb to break. Thereafter the nail may be struck again to embed the projection 35 and the head.

In order to remove the spike or nail after it has been locked, the head 10 (Figs. 1 and 2) or 25 (Fig. 4) is provided at the side above the locked shank portion 12 or 27, respectively, with a projecting portion 36 adapted to be engaged by a crow bar, claw of a hammer, or other suitable tool. By prying the projecting portion upwardly the shorter shank portion 12 or 27 is pulled upwardly first and is moved inwardly towards the shank portion 11 or 26, respectively, to unlock the spike or nail and permit it to be pulled upwardly. Easy removal of the spikes is particularly desirable when they are used for securing rails to ties because the ties must be replaced from time to time.

The spikes embodying the present improvements may be of any suitable material, for example, cast iron, and may be readily made by suitable casting and finishing operations which are relatively inexpensive and do not require special machinery. Where these improvements are applied to nails or the like, the nails may be made by suitable forging or stamping operations. This enables the nails and spikes to be produced in large quantities without any material increase in cost over nails or spikes of the usual type.

From the foregoing description it will be seen that the present invention provides improved nails or spikes which can be readily locked against accidental removal. The spikes are particularly adapted for holding down rails which are subjected to heavy loads without any danger of the spikes being dislodged even after prolonged use of the rails. This makes the tracks safer and eliminates the necessity of frequent repair and inspection. The spikes or nails can be economically manufactured and can be driven home by unskilled laborers. The cam means are effective to spread the spikes in every instance, thus insuring proper anchoring of the spikes into the ties. Due to the effectiveness with which nails or spikes constructed in accordance with the present invention can be embedded, relatively shorter nails or spikes can be used. As a result less material is required to make the nails or spikes and a greater number of them are in a pound.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the folowing claims is intended to cover all of the generic and specific features of the invention herein described and all statements of the scope of the invention which, as a matter of language, might be said to fall therebetween.

Having thus described my invention, I claim:

1. A one-piece nail or spike comprising a head, a pair of shank portions depending from the head and adapted to lie adjacent each other throughout a major portion of their length, one of said shank portions being longer than the other and having an enlarged part adjacent its end provided with an inclined face against which the end of said other shank portion may abut and cause said shank portions to spread apart when a blow is struck on the the head adjacent said short shank, and a breakable pin for normally holding said shank portions together.

2. A one-piece nail or spike comprising a head, and a pair of shank portions depending from the head, one of said shank portions being longer than the other and having a portion at its end against which the end of said other shank portion is adapted to abut, one of said shank portions having outwardly extending projections below and adjacent said head and a recess intermediate said projections.

3. A nail or spike comprising a head, a pair of shank portions depending from said head and eccentrically disposed with respect to said head and normally lying adjacent each other throughout a major portion of their length, said shank portions having a recess intermediate thereto adjacent said head, said recess extending towards one side of said head, one of said shank portions being longer than the other and having an enlarged part at the free end terminating in a tapered portion, upwardly facing cooperating cam means on the enlarged part of said longer shank portion and on the end of said other shank portion adapted to spread said shank portions apart, said longer shank portions having outwardly extending stops adjacent and below said head and a slot intermediate said stops, and a pin adjacent said cam means for normally holding said shank portions together.

4. A nail or spike comprising a head, a pair of shank portions depending from said head, one of said shank portions being longer than the other, said longer shank portion having an outwardly and upwardly facing cam portion adjacent its end and having an outwardly projecting breakable portion provided with an upwardly and inwardly facing portion, said shorter shank portion having at its end a downwardly and inwardly facing cam portion adapted to cooperate with said upwardly and outwardly facing cam portion to spread said shank portions apart and having a downwardly and outwardly facing portion positioned to engage said upwardly and inwardly face portion and adapted to break said breakable portion of said longer shank portion.

5. A spike comprising a relatively flat striking head and a body depending from the head and lying wholly within the periphery of the head, said body comprising a pair of shanks normally lying in abutting relationship for a major part of their length, one of said shanks depending vertically from its point of connection to the head and the other shank being connected to the head by an offset portion extending laterally from the shank and outwardly from the other shank and secured to the under side of the head at a point spaced from the other shank to provide an opening between the shanks underlying the central portion of the head, said offset portion being adapted to limit the downward movement of the shank connected thereto when the spike has been driven a predetermined amount, one of said shanks being of greater length than the other and having a portion underlying the shorter shank to form a substantial continuation thereof, and camming means provided on said shanks above the said underlying portion of said longer shank for spreading said shanks apart when the downward movement of the shank having the offset portion is limited.

ERVIN E. ROBERTS.